United States Patent
Ji et al.

(10) Patent No.: US 12,526,679 B2
(45) Date of Patent: Jan. 13, 2026

(54) MEASUREMENT CONFIGURATION IN NON-TERRESTRIAL NETWORKS (NTNs)

(71) Applicant: QUALCOMM Incorporated, San Diego, CA (US)

(72) Inventors: Lianghai Ji, San Diego, CA (US); Mehmet Izzet Gurelli, San Diego, CA (US); Jun Ma, San Diego, CA (US); Qiang Wu, San Diego, CA (US); Mohamad Sayed Hassan, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/318,580

(22) Filed: May 16, 2023

(65) Prior Publication Data
US 2024/0388939 A1   Nov. 21, 2024

(51) Int. Cl.
*H04W 24/00* (2009.01)
*H04W 24/10* (2009.01)
*H04W 84/06* (2009.01)

(52) U.S. Cl.
CPC ............ *H04W 24/10* (2013.01); *H04W 84/06* (2013.01)

(58) Field of Classification Search
CPC ...................................... H04W 24/10
See application file for complete search history.

(56) References Cited

U.S. PATENT DOCUMENTS

2012/0307670 A1 * 12/2012 Kazmi ................. H04W 24/10
                                                                    370/252
2024/0178962 A1 *  5/2024 Cui ....................... H04L 5/0094

FOREIGN PATENT DOCUMENTS

WO   WO-2022219589 A1 * 10/2022 ........... H04B 7/1851
WO      2023010543 A1    2/2023

OTHER PUBLICATIONS

International Search Report and Written Opinion—PCT/US2024/025265—ISA/EPO—Sep. 17, 2024.

* cited by examiner

Primary Examiner — Erika A Washington
(74) Attorney, Agent, or Firm — Seyfarth Shaw LLP

(57) ABSTRACT

A method for wireless communication by a user equipment (UE) includes transmitting a first message indicating whether a first neighbor cell measurement is supported without a first measurement gap, when the first neighbor cell and/or a serving cell comprise a non-terrestrial network (NTN) cell. The method also includes receiving a measurement gap configuration for the first neighbor cell measurement, based on the first message indicating the first neighbor cell measurement is supported with a measurement gap.

27 Claims, 9 Drawing Sheets

MEASUREMENT CONFIGURATION IN NON-TERRESTRIAL NETWORKS (NTNs)

INTRODUCTION

The present disclosure relates generally to non-terrestrial network (NTN) communications, and more specifically to improving measurement configurations in non-terrestrial networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as new radio (NR) systems. These systems may employ technologies such as code division multiple access (CDMA), time division multiple access (TDMA), frequency division multiple access (FDMA), orthogonal frequency division multiple access (OFDMA), orthogonal frequency division multiplexing (OFDM), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A non-terrestrial network is an example of wireless communications systems that uses satellites and high-altitude platforms (e.g., drones) as relay devices in communication with ground devices. Alternatively, the satellites and high-altitude platforms may operate as base stations instead of relay devices. Procedures for operating in non-terrestrial networks may differ from procedures specified for terrestrial networks. Therefore, procedures should be improved to account for characteristics of non-terrestrial networks.

SUMMARY

In aspects of the present disclosure, a method for wireless communication by a user equipment (UE) includes transmitting a first message indicating whether a first neighbor cell measurement is supported without a first measurement gap, when the first neighbor cell and/or a serving cell comprise a non-terrestrial network (NTN) cell. The method also includes receiving a measurement gap configuration for the first neighbor cell measurement, based on the first message indicating the first neighbor cell measurement is supported with a measurement gap.

In other aspects of the present disclosure, a method for wireless communication by a network device includes receiving a first message indicating whether a first neighbor cell measurement is supported without a first measurement gap, when the first neighbor cell and/or a serving cell comprise a non-terrestrial network (NTN) cell. The method also includes transmitting a measurement gap configuration for the first neighbor cell measurement, based on the first message indicating the first neighbor cell measurement is supported with a measurement gap.

Other aspects of the present disclosure are directed to an apparatus. The apparatus has a memory and one or more processors coupled to the memory. The processor(s) is configured to transmit a first message indicating whether a first neighbor cell measurement is supported without a first measurement gap, when the first neighbor cell and/or a serving cell comprise a non-terrestrial network (NTN) cell. The processor(s) is also configured to receive a measurement gap configuration for the first neighbor cell measurement, based on the first message indicating the first neighbor cell measurement is supported with a measurement gap.

Other aspects of the present disclosure are directed to an apparatus. The apparatus has a memory and one or more processors coupled to the memory. The processor(s) is configured to receive a first message indicating whether a first neighbor cell measurement is supported without a first measurement gap, when the first neighbor cell and/or a serving cell comprise a non-terrestrial network (NTN) cell. The processor(s) is also configured to transmit a measurement gap configuration for the first neighbor cell measurement, based on the first message indicating the first neighbor cell measurement is supported with a measurement gap.

The described techniques relate to improved methods, systems, devices, and apparatuses that support measurement configurations for non-terrestrial networks. Generally, the described techniques provide for a wireless communications system that may be a non-terrestrial network, which may include a base station (e.g., a gateway), a user equipment (UE), and a satellite in wireless communications with the base station and the UE, among other components. In some cases, the base station may be integrated or located on board the satellite.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
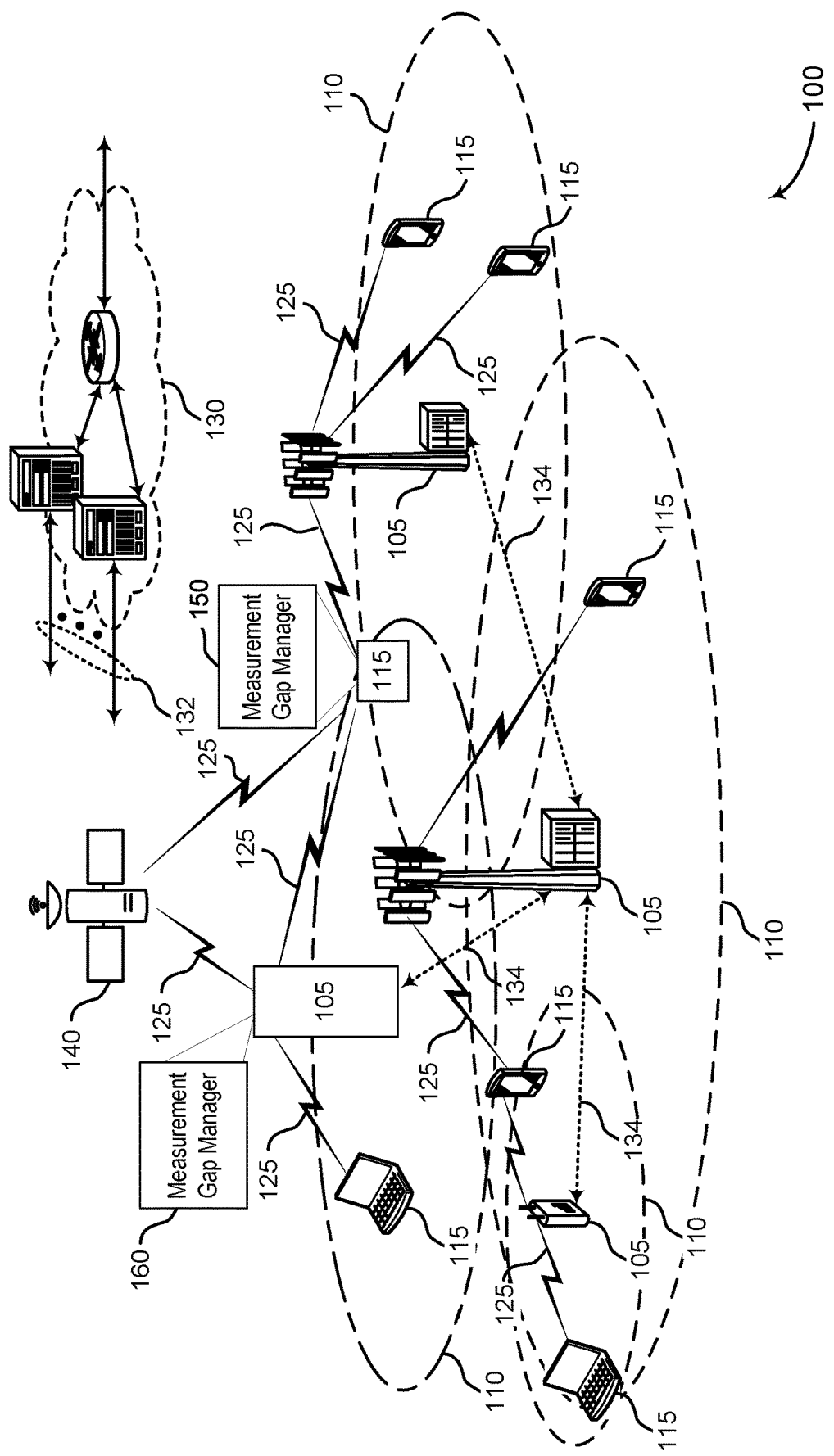
FIG. 1 illustrates an example of a wireless communications system that supports measurement gap configuration for non-terrestrial networks (NTNs), in accordance with various aspects of the present disclosure.

A wireless communications system may be a non-terrestrial network (NTN) including a base station that may utilize a satellite (e.g., a non-geostationary satellite) to relay communications to one or more user equipment (UEs). In other scenarios, the satellite may operate as a base station. In addition to a satellite, the network device/entity that a UE connects to over the air can be a balloon, a drone, etc. A non-terrestrial network can provide service coverage to areas where terrestrial cellular service is not available.

For non-terrestrial network (NTN) communications using fifth generation (5G) new radio (NR) procedures, NTN characteristics make it challenging to reuse existing measurement gap configuration procedures. The propagation delay is one NTN parameter that differs with respect to terrestrial networks. Additionally, the Doppler effect is also larger for NTNs than terrestrial networks due to an increased mobility of the satellite (or other NTN entity).

Due to the movements of satellites, a connected UE may experience frequent handover (HO). For example: The UE may be handed over from a first cell to a second cell, when both cells are served by the same satellite. The UE may be handed over from a first cell to a second cell, when the two cells are served by two different satellites. In order for a network to determine a proper handoff configuration (for example, to determine the target handover cell), the network may configure the UE to perform intra-frequency neighbor (cell) measurements and/or inter-frequency neighbor (cell) measurements, and then report its measurement results. In the legacy solution, the UE may indicate to the network if a measurement gap is required for the UE to perform synchronization signal block (SSB)-based measurements, based on the UE's own capability. Some UEs may not need a measurement gap due to the higher complexity of the UE. Based on the UE's indication, the network can determine and configure a measurement gap to the UE.

According to aspects of the present disclosure, a UE sends, to the network, a message indicating whether a measurement gap is needed for measuring a cell in an NTN. In some aspects, the indication may be different from the UE's indication for measurement in a terrestrial network. According to some aspects of the present disclosure, the UE may indicate a need for a measurement gap for intra-frequency or inter-frequency neighbor cell measurement in the NTN, which is different from the corresponding terrestrial network indication, due to the more severe delay and Doppler effect. Based on the UE's indication, the network determines or updates if a measurement gap is to be configured for the UE to measure a neighbor cell in an NTN. In some aspects, the techniques may be used for devices requiring low cost and/or low complexity, for example, Internet of Things (IoT) or reduced capacity (RedCap) devices.

Advantages of the NTN measurement gap configurations include allowing networks to determine if a measurement gap should be configured for the UE to measure a neighbor cell in NTNs. Allocating a necessary measurement gap helps the UE execute its measurement task properly and, thus, the described aspects provide better support for mobility and service continuity. Moreover, the described aspects avoid unnecessary measurement gaps, helping the system avoid unnecessary communication interruption. As a result, better mobility reliability is achieved. In addition, a higher data rate may be realized due to the avoidance of unnecessary measurement gap/communication interruptions.

FIG. 1 illustrates an example of a wireless communications system 100 that supports measurement gap configuration for non-terrestrial networks (NTNs), in accordance with various aspects of the present disclosure. The wireless communications system 100 includes base stations 105, UEs 115, and a core network 130. In some examples, the wireless communications system 100 may be a long term evolution (LTE) network, an LTE-Advanced (LTE-A) network, an LTE-A Pro network, or a new radio (NR) network. In some cases, the wireless communications system 100 may support enhanced broadband communications, ultra-reliable (e.g., mission critical) communications, low latency communications, or communications with low cost and low complexity devices.

Base stations 105 may wirelessly communicate with UEs 115 via one or more base station antennas. Base stations 105 described may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include upstream transmissions from a UE 115 to a base station 105, or downstream transmissions from a base station 105 to a UE 115. Downstream transmissions may also be called downlink or forward link transmissions while upstream transmissions may also be called uplink or reverse link transmissions.

The geographic coverage area 110 for a base station 105 may be divided into sectors each making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier) or a satellite beam, and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking. Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downstream transmissions, upstream transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix (CP) prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downstream or upstream (e.g., in an FDD mode), or be configured to carry downstream and upstream communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downstream carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downstream CCs and one or more upstream CCs according to a carrier aggregation configuration. Carrier aggregation may be used with both FDD and TDD component carriers.

In some cases, the wireless communications system 100 may utilize enhanced component carriers (cCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing cCCs may transmit wideband signals (e.g., according to frequency channel or carrier bandwidths of 20, 40, 60, 80 MHZ, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, the wireless communications system 100 may be or be related to a terrestrial network. Some examples of terrestrial networks may include NR systems, for example, including base stations 105 and UE s 115. Within an NR system, upstream transmissions (e.g., CP-OFDM or DFT-S-OFDM waveforms) may arrive at a base station 105 from a UE 115 within an interval time, for example, within a CP duration. For subcarrier spacing of 120 kHz, the CP duration may be approximately 0.59 µs. Additionally, subcarrier spacing for mmW communications within Ka band such as, downstream transmissions between approximately 20 GHz and 30 GHz may be greater compared to upstream transmissions. For example, the subcarrier spacing greater than 120 kHz may improve communication reliability due to frequency error as a result of Doppler. In this example, a subcarrier spacing greater than 120 kHz may result in a CP duration of 0.25 µs.

In some examples, the wireless communications system 100 may additionally, or alternatively, be or be related to a non-terrestrial network. For example, the base stations 105 may utilize the satellite 140 to relay communications to the UEs 115. Due to the mobility of the satellite 140 and the distance from the satellite 140 to the UEs 115, the communications may experience upstream timing errors (e.g., downstream timing tracking errors, variation in propagation delay). For example, the satellite 140 may be a non-geostationary satellite that may orbit the UEs 115 from 600 km and travel at a speed of approximately 7.6 km/s. As a result, the round-trip time (e.g., an update rate) between the satellite 140 and the UEs 115 may change as much as 50 µs per second.

For example, assuming that an upstream timing is ideal at time t (e.g., without any timing adjustment applied to the time t), approximately 10 ms later, the upstream timing error may be approximately 0.5 µs. As a result, the round-trip time for the satellite 140 may be approximately 30 ms, and a timing advance command calculated based on upstream transmission at time t may be off by 1.5 μs when it arrives at a UE 115. To compensate for the upstream timing error, the base station 105 (also referred to as "a gateway") may provide a timing command to the UEs 115 for upstream transmissions. The UEs 115 may receive the timing command and transmit an upstream transmission to the base station 105 using a timing adjustment indicated in the timing command.

According to various aspects of the present disclosure, each of the UEs 115 may include a measurement gap manager 150 for configuring measurement gaps in NTN scenarios. Although only one of the UEs 115 is shown with the measurement gap manager 150, the measurement gap manager 150 may be provided to each of the UEs 115. The measurement gap manager 150 may transmit a first message indicating whether a first neighbor cell measurement is supported without a first measurement gap, when the first neighbor cell and/or a serving cell comprise a non-terrestrial network (NTN) cell. The measurement gap manager 150 may also receive a measurement gap configuration for the first neighbor cell measurement, based on the first message indicating the first neighbor cell measurement is supported with a measurement gap.

According to various aspects of the present disclosure, each of the base stations 105 may include a measurement gap manager 160 to enable configuring of measurement gaps in NTN scenarios. Although only one of the base stations 105 is shown with the measurement gap manager 160, the measurement gap manager 160 may be provided to each of the base stations 105. The measurement gap manager 160 may receive a first message indicating whether a first neighbor cell measurement is supported without a first measurement gap, when the first neighbor cell and/or a serving cell comprise a non-terrestrial network (NTN) cell. The measurement gap manager 160 may also transmit a measurement gap configuration for the first neighbor cell measurement, based on the first message indicating the first neighbor cell measurement is supported with a measurement gap.

Figure 2:
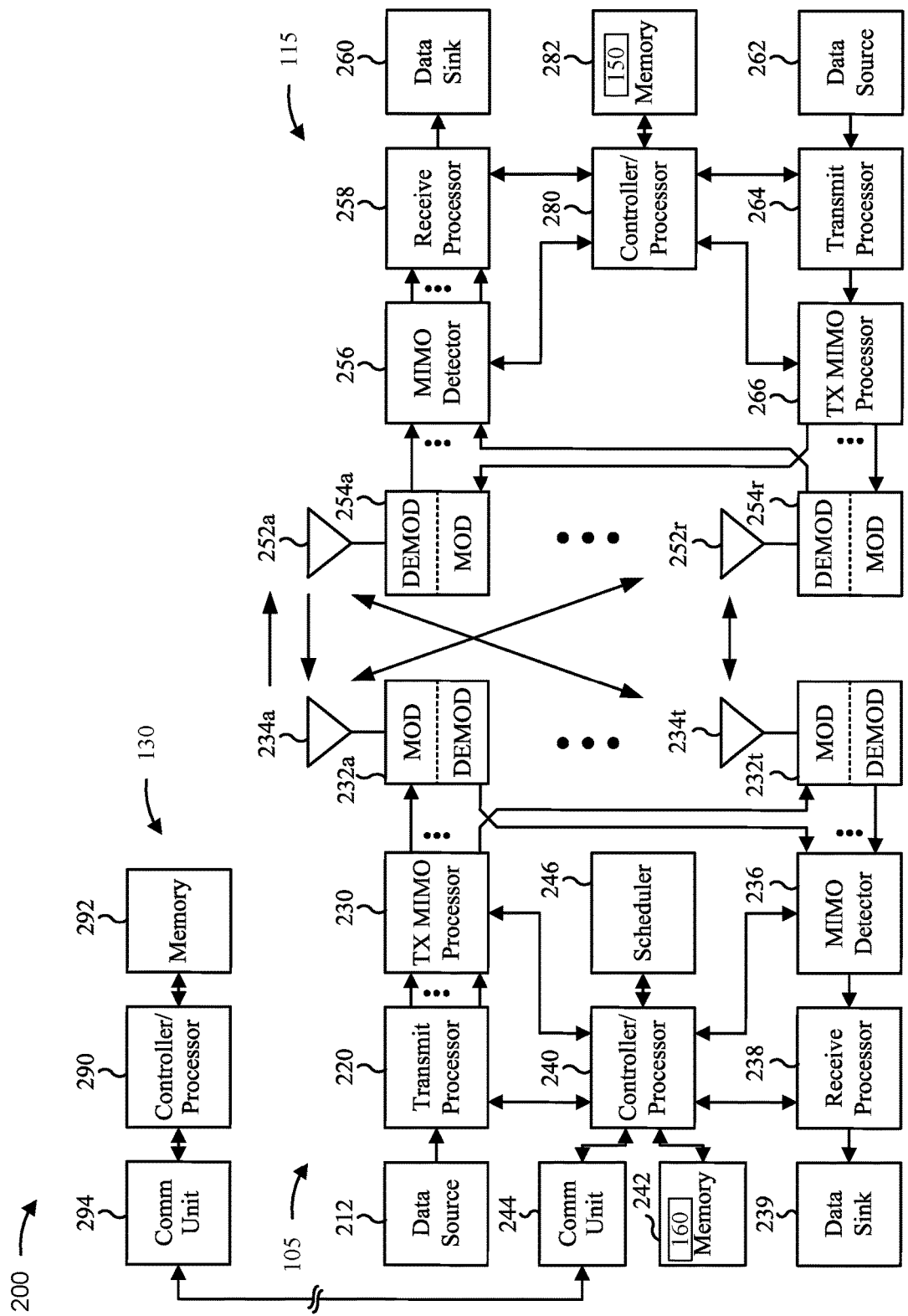
FIG. 2 illustrates an example of a wireless communications system that supports measurement gap configuration for non-terrestrial networks, in accordance with various aspects of the present disclosure.

FIG. 2 illustrates an example of a wireless communications system that supports MDT reporting for non-terrestrial networks, in accordance with various aspects of the present disclosure. FIG. 2 shows a block diagram of a design 200 of base station 105 and UE 115, which may be one of the base stations and one of the UEs in FIG. 1. Base station 105 may be equipped with T antennas 234a through 234t, and UE 115 may be equipped with R antennas 252a through 252r, where in general T≥1 and R≥1.

At base station 105, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 115, antennas 252a through 252r may receive the downlink signals from base station 105 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 115 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 115 may be included in a housing.

On the uplink, at UE 115, a transmit processor 264 may receive and process data from a data source 262 and control information (e.g., for reports comprising RSRP, RSSI, RSRQ. CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 105. At base station 105, the uplink signals from UE 115 and other UEs may be received by antennas 234, processed by demodulators 254, detected by a MIMO detector 236 if applicable, and further processed by a receive processor 238 to obtain decoded data and control information sent by UE 115. Receive processor 238 may provide the decoded data to a data sink 239 and the decoded control information to controller/processor 240. Base station 105 may include communication unit 244 and communicate to the core network 130 via communication unit 244. The core network 130 may include communication unit 294, controller/processor 290, and memory 292.

Controller/processor 240 of base station 105, controller/processor 280 of UE 115, and/or any other component(s) of FIG. 2 may perform one or more techniques associated with measurement gap configuration, as described in more detail elsewhere. For example, controller/processor 240 of base station 105, controller/processor 280 of UE 115, and/or any other component(s) of FIG. 2 may perform or direct operations of, for example, the processes 900 and 1000 of FIGS. 9 and 10 and/or other processes as described. Memories 242 and 282 may store data and program codes for base station 105 and UE 115, respectively. For example, the memory 292 may store the measurement gap manager 160, and the memory 242 may store the measurement gap manager 150. A scheduler 246 may schedule UEs for data transmission on the downlink and/or uplink.

In some aspects, UE 115 may include means for means for transmitting, means for receiving, means for determining, and means for estimating. The base station 105 can include means for receiving, means for transmitting, means for estimating, and means for determining. Such means may include one or more components of the UE 115 or base station 105 described in connection with FIG. 2.

As indicated above, FIG. 2 is provided merely as an example. Other examples may differ from what is described with regard to FIG. 2.

Figure 3:
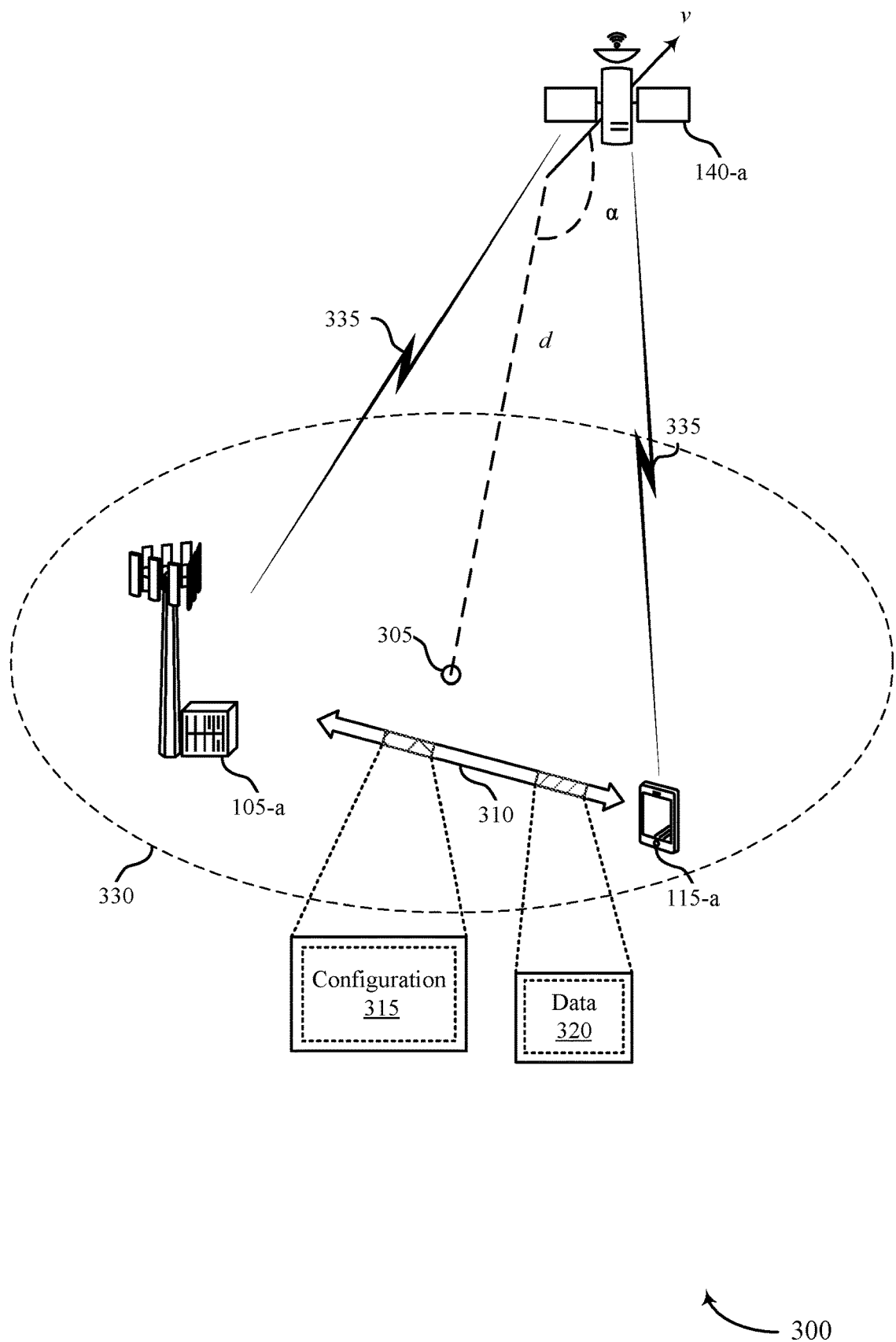
FIG. 3 illustrates an example of a non-terrestrial network that supports measurement gap configuration for non-terrestrial networks, in accordance with various aspects of the present disclosure.

FIG. 3 illustrates an example of a wireless communications system 300 that supports measurement gap configuration for non-terrestrial networks in accordance with various aspects of the present disclosure. In some examples, the wireless communications system 300 may implement aspects of the wireless communications system 100. The wireless communications system 300 may include a base station 105-a, a UE 115-a, and a satellite 140-a, which may be examples of the corresponding devices described with reference to FIG. 1. For example, the wireless communications system 300 may be a non-terrestrial network, which may include a base station 105-a, a UE 115-a, and a satellite 140-a. The satellite 140-a may relay communications for base stations (e.g., base station 105-a) and mobile terminals (e.g., UE 115-a). The base station 105-a may also be referred to as a gateway. The geographical area associated with a transmission beam of the satellite 140-a may be called a beam footprint 330 and UE 115-a may communicate with the satellite 140-a when the UE 115-a is located within the beam footprint 330.

The base station 105-a may perform a communication procedure (e.g., an RRC procedure, such as a cell acquisition procedure, random access procedure, RRC connection procedure, RRC configuration procedure) with the UE 115-a. The base station 105-a may be configured with multiple antennas, which may be used for directional or beamformed transmissions. As part of the communication procedure, the base station 105-a may establish a bi-directional communication link 310 for communication with the UE 115-a. Additionally, or alternatively, as part of the communication procedure, the base station 105-a may configure the UE 115-a with configuration 315 (e.g., time and frequency resources, a reference signal periodicity, an indication of a symbol of a slot for transmitting reference signals) via RRC signaling. Although shown communicating directly, the present disclosure also contemplates when the UE 115-a communicates to the base station 105-a via the satellite 140-a.

The satellite 140-a may generate satellite information (e.g., ephemeris information) associated with communications between the satellite 140-a, the UE 115-a, and the base station 105-a. For example, the satellite 140-a may determine a propagation delay associated with transmissions between the satellite 140-a, the UE 115-a, and the base station 105-a. In some cases, the propagation delay may be based on the distance d from the satellite 140-a to the point 305 (e.g., center) of the beam footprint 330. In other cases, the propagation delay may be a factor of the distance d, which may correspond to the round-trip distance between the base station 105-a and the satellite 140-a. Additionally or alternatively, the propagation delay may be an estimated round trip delay or a round-trip time between the UE 115-a and the base station 105-a, which may be based at least in part on d and/or 2d. It should be noted that the distance d may not reflect the precise distance from the satellite 140-a to the UE 115-a. For example, the UE 115-a may be located at an edge of the beam footprint 330 and may be a different distance from the satellite 140-a than d. However, such a difference in distance may be insignificant compared to d. Thus, the distance d may be a sufficient representation of the distance from the satellite 140-a to the UE 115-a. More details about estimating delay are described below with reference to FIG. 5.

The satellite 140-a may transmit, via wireless communication links 335, the satellite information to the base station 105-a and/or the UE 115-a, which may be located within the beam footprint 330. In some cases, the satellite 140-a may update and transmit the satellite information to the base station 105-a and/or the UE 115-a at a preconfigured schedule (e.g., an update rate). The preconfigured schedule may be based on a velocity of the satellite 140-a. For example, the velocity of the satellite 140-a may result in a maximum round-trip time variation rate of 50 µs per second. That is, for every second of movement of the satellite 140-a, the round-trip time of communications between the satellite 140-a and the UE 115-a, for example, may vary by 50 µs. The round-trip time variation rate may also vary based on the movement of the satellite (e.g., orbit). In such instances, the satellite 140-a may update the satellite information multiple times every second. Additionally, or alternatively, the base station 105-a may transmit the satellite information to the UE 115-a via the bi-directional communication link 310, for example, as part of the configuration 315. In some cases, the base station 105-a may transmit the satellite information (e.g., data 320) to the UE 115-a based on the preconfigured schedule, for example, the update rate of the satellite 140-a.

The satellite information may also include the velocity of the satellite 140-a. The velocity of the satellite 140-a may, in some cases, be defined by or relate to the following expression v×cos($\alpha$), where $\alpha$ is the angle between the vector of velocity v and the vector of distance d. The UE 115-a may use the velocity of the satellite 140-a to determine the round-trip time variation rate. In some cases, the UE 115-a may determine the round-trip time variation rate using the velocity of the satellite 140-a based at least in part on the UE 115-a being located relative to the point 305 of the beam footprint 30. In some examples, using the velocity of the satellite 140-a, the round-trip time variation rate may be defined by the following expression $-2v \times \cos(\alpha)/c$, where $\alpha$ is the angle between the vector of velocity v and the vector of distance d, and c is the speed of light. As such, if an upstream transmission is scheduled to be transmitted at time to with a timing adjustment $t_a$, the actual transmission time by the UE 115-a may be $t_0 + t_a$. For a subsequent upstream transmission scheduled to be transmitted at time $t_a + \Delta t$ without a new timing adjustment provided by the base station 105-a, the actual transmission time by the UE 115-a may be $t_a + \Delta t \times (-2v \times \cos(\alpha)/c)$.

When the UE 115-a is in the discontinuous reception (DRX) mode and in RRC-idle or RRC-connected, the base station 105-a may transmit downlink control information in certain time and frequency resources (e.g., fixed symbols). Between these time and frequency resources, the UE 115-a may enter a lower-power state, also referred to as "sleep mode," so as to reduce power consumption and increase battery life for the UE 115-a. In RRC-idle or RRC-connected, the UE 115-a may wakeup once every number of symbols to receive a downstream transmission from the base station 105-*a* and/or the satellite 140-*a*. The gap periods allocated prior to and following a reference signal transmission may be benefit the base station 105-*a* by reducing or eliminating interferences between the UE 115-*a* transmission and a transmission from another neighboring UE.

Figure 4:
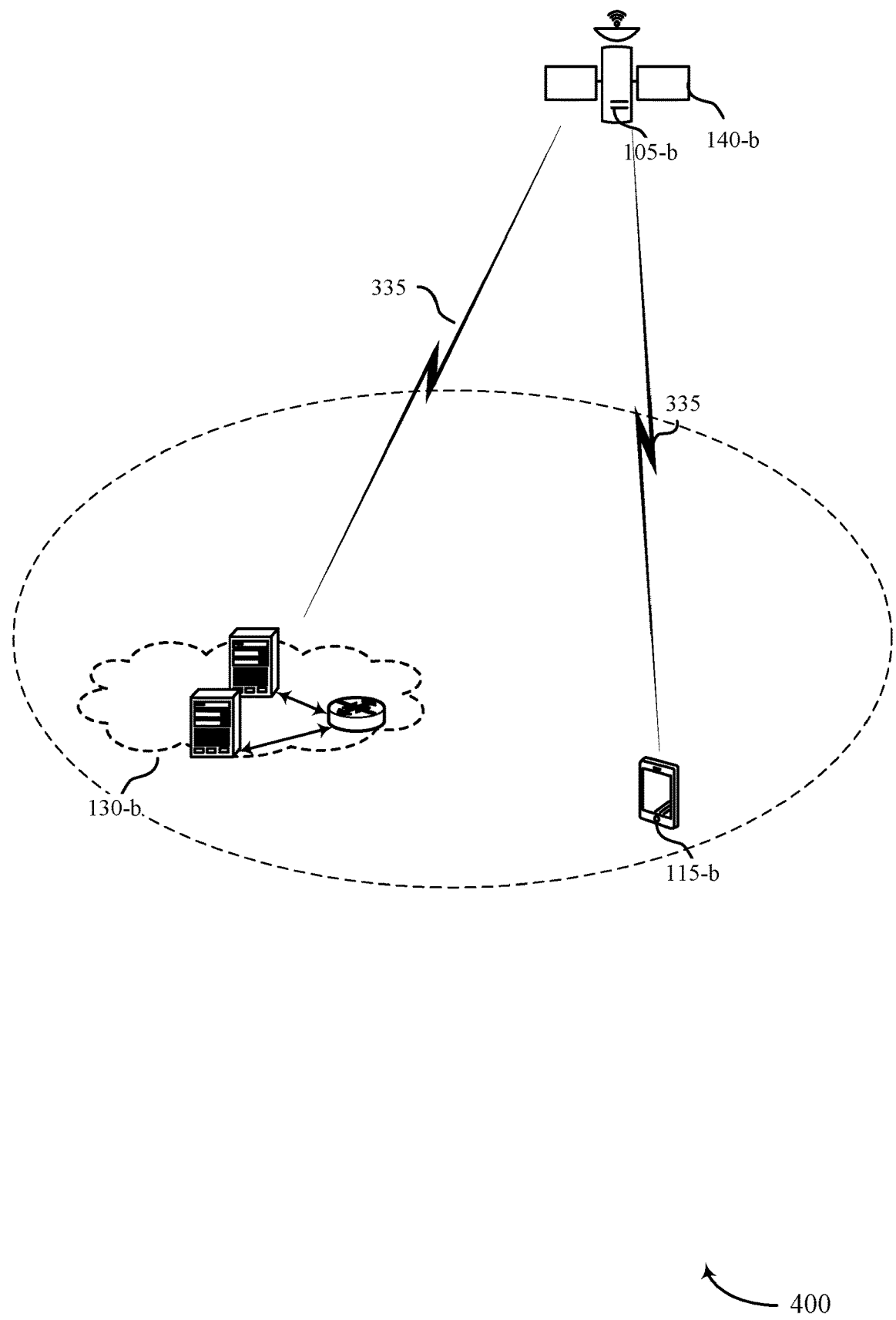
FIG. 4 illustrates an example of a non-terrestrial network that supports measurement gap configuration for non-terrestrial networks, in accordance with various aspects of the present disclosure.

FIG. 4 illustrates an example of a non-terrestrial network that supports measurement gap configuration for non-terrestrial networks, in accordance with various aspects of the present disclosure. FIG. 4 shows an alternate network configuration. In this configuration, the base station 105-*b* is located on the satellite 140-*b*. The base station 105-*b* communicates with the core network 130-*b* via wireless communication links 335. The UE 115-*b* communicates with the non-terrestrial base station 105*b* via wireless communication links 335.

For non-terrestrial network (NTN) communications using 5G NR procedures. NTN characteristics make it challenging to reuse existing measurement gap configuration procedures. Enhancements are desired for NR non-terrestrial networks, especially those with nodes in low Earth orbit (LEO), medium Earth orbit (MEO) and geostationary Earth orbit (GEO). Such enhancements may also be compatible with high altitude platform station (HAPS) and air-to-ground (ATG) scenarios. An Earth fixed tracking area may be assumed with Earth fixed and moving cells. That is, the UE is stationary, whereas the satellite is mobile. User equipment (UEs) with global navigation satellite system (GNSS) capabilities, such as global positioning system (GPS), may be assumed in some scenarios.

Aspects of the present disclosure provide techniques for measurement gap configuration for NTN environments.

Figure 5:
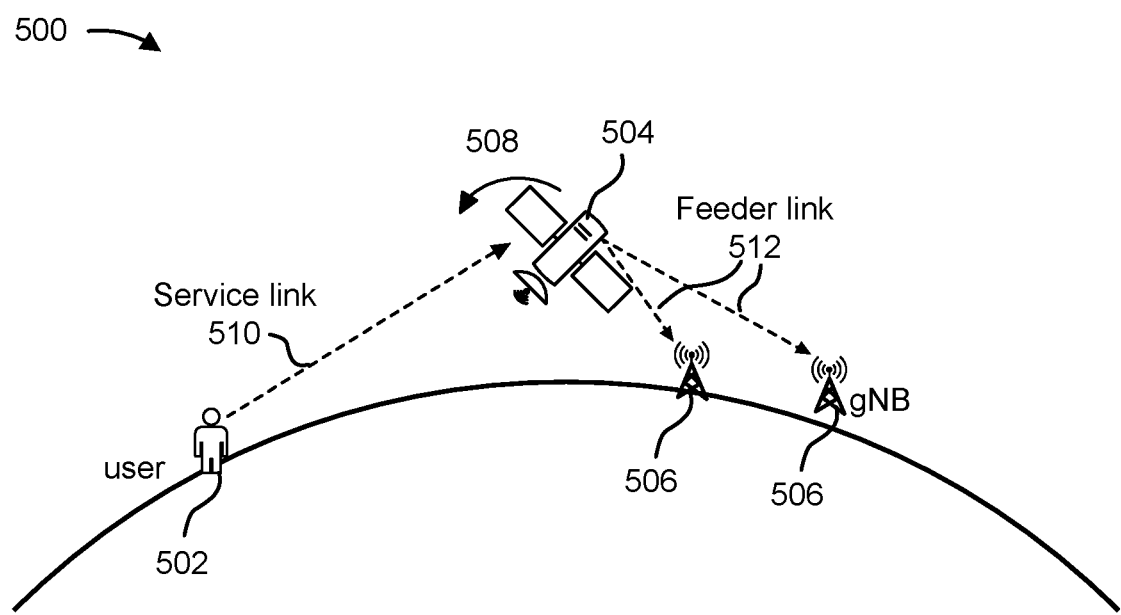
FIG. 5 illustrates an example of a non-terrestrial network, in accordance with various aspects of the present disclosure

FIG. 5 illustrates an example of a non-terrestrial network 500, in accordance with various aspects of the present disclosure. A total one way propagation delay is equal to a delay ($D_{UE}$) on a service link 510 between a UE 502 and a satellite 504 plus a delay ($D_{sat}$) on a feeder link 512 between the satellite 504 and a base station (e.g., gNB) 506. If the base station 506 resides at the satellite 504, the total one way propagation delay is equal to the delay between the UE 502 and the satellite 504 ($D_{UE}$). The UE 502 may estimate the delay $D_{UE}$ based on location information, for example, with global navigation satellite system (GNSS) capability, but may not be able to estimate the delay $D_{sat}$ due to the speed of the satellite or handover of a feeder link 512. In the example of FIG. 5, the satellite moves at a speed of 7.5 km/s along a trajectory 508, which can be predicted by the UE 502 based on ephemeris data. The UE 502 may estimate its position based on the ephemeris data. The delay for the feeder link 512 may be $D_{sat}-\Delta_{sat}$, where $\Delta_{sat}$ is the change in satellite position. It is noted that when the network node is the satellite 504, for example, when no base station is involved, the propagation delay is only the delay between the satellite 504 and the UE 502. The propagation delay is one NTN parameter that differs with respect to terrestrial networks. In addition, the Doppler effect is also larger for NTNs than terrestrial networks due to the higher mobility of the satellite (or other NTN entity).

Figure 6:
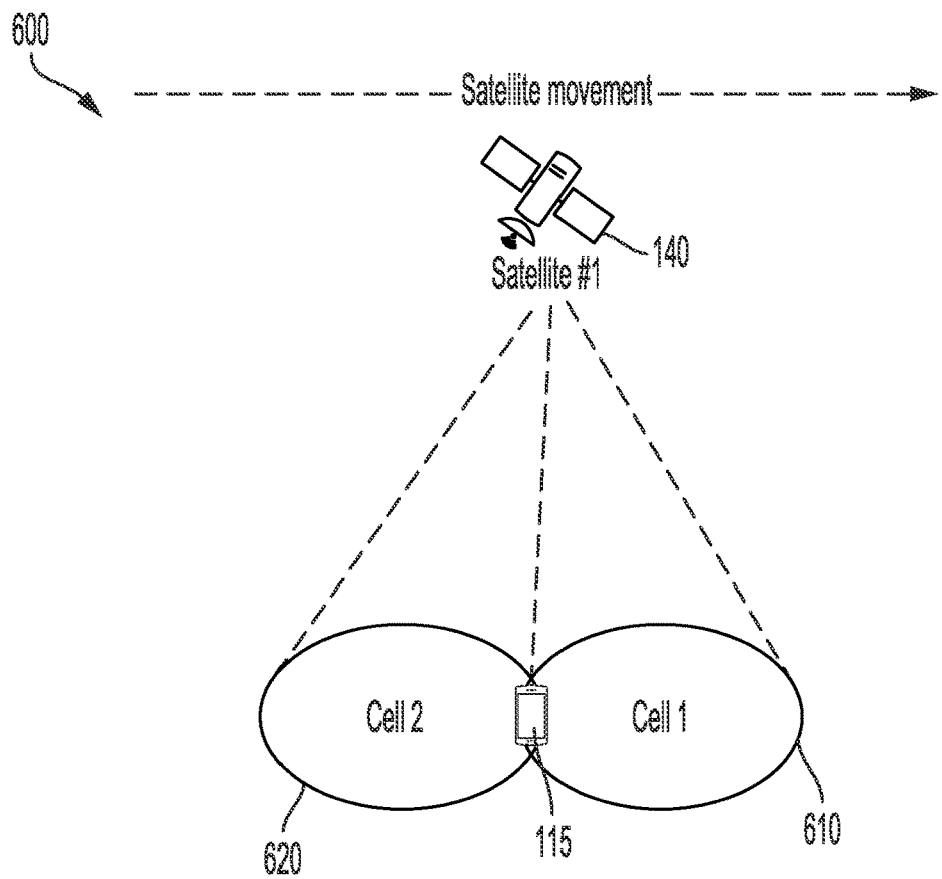
FIG. 6 is a diagram illustrating a wireless communications system with a single satellite serving multiple cells, in accordance with one or more aspects of the present disclosure.
Figure 7:
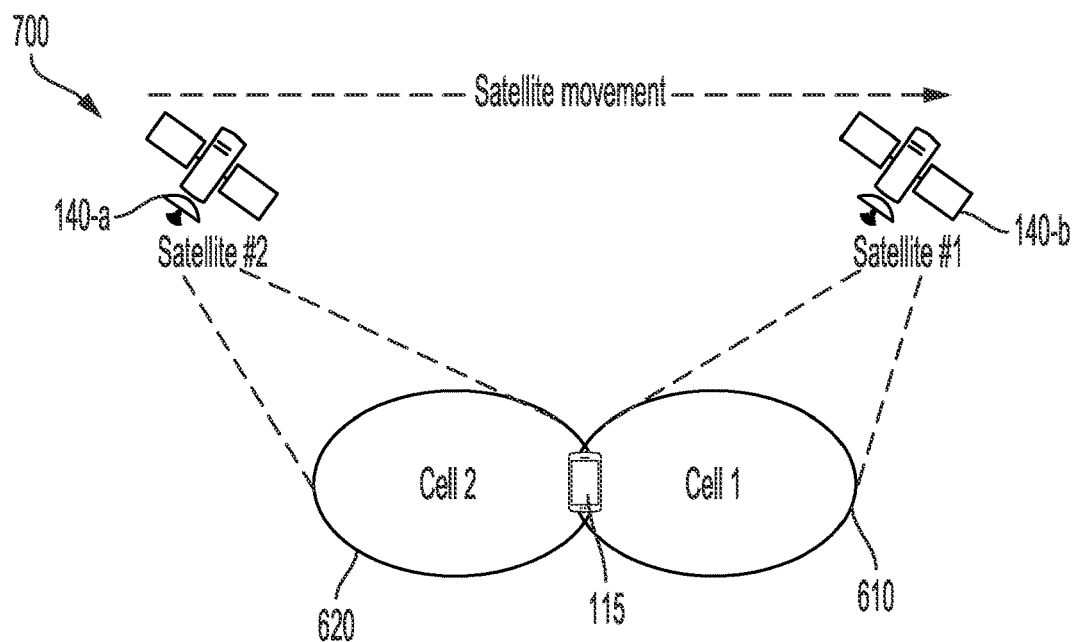
FIG. 7 is a diagram illustrating a wireless communications system with multiple satellites serving multiple cells, in accordance with one or more aspects of the present disclosure.

Due to the movements of satellites, a connected UE may experience frequent handover (HO). For example: The UE may be handed over from a first cell to a second cell, when both cells are served by the same satellite. The UE may be handed over from a first cell to a second cell, when the two cells are served by two different satellites. FIG. 6 is a diagram illustrating a wireless communications system 600 with a single satellite serving multiple cells, in accordance with one or more aspects of the present disclosure. FIG. 7 is a diagram illustrating a wireless communications system 700 with multiple satellites serving multiple cells, in accordance with one or more aspects of the present disclosure. In the example of FIG. 6, the wireless communications system 600 may include a UE 115, and a satellite 140, which may be examples of the corresponding devices described with reference to FIG. 1. The UE 115 moves from a serving cell 610 to a neighbor cell 620 due to movement of the satellite 140, even if the UE 115 remains stationary. In other aspects, the UE 115 moves from the serving cell 610 to the neighbor cell 620 due to movement of the UE 115. In the example of FIG. 7, the wireless communications system 700 may include a UE 115, a first satellite 140-*a*, and a second satellite 140-*b*, which may be examples of the corresponding devices described with reference to FIG. 1. The UE 115 moves from a serving cell 610 to a neighbor cell 620 due to movement of the satellites 140-*a*, 140-*b*, even if the UE 115 remains stationary. In other aspects, the UE 115 moves from the serving cell 610 to the neighbor cell 620 due to movement of the UE 115.

In order for a network to determine a proper handoff configuration (for example, to determine the target handover cell), the network may configure the UE to perform intra-frequency neighbor cell measurements and/or inter-frequency neighbor cell measurements, and then report the measurement results. In some aspects, the neighbor cell measurements may be based on measuring a reference signal transmitted by the neighbor cell, such as SSB, channel state information reference signal (CSI-RS), tracking reference signal (TRS), and/or positioning reference signal (PRS). According to the Third Generation Partnership Project (3GPP) TS 38.300, SSB-based intra-frequency neighbor (cell) measurements and inter-frequency neighbor (cell) measurements are defined as follows: synchronization signal block (SSB)-based intra-frequency measurement: a measurement is defined as an SSB-based intra-frequency measurement, provided the center frequency of the SSB of the serving cell and the center frequency of the SSB of the neighbor cell are the same, and the subcarrier spacing of the two SSBs is also the same. SSB-based inter-frequency measurement: a measurement is defined as an SSB-based inter-frequency measurement, provided the center frequency of the SSB of the serving cell and the center frequency of the SSB of the neighbor cell are different, or the subcarrier spacing of the two SSBs is different.

In the legacy solution, the UE may indicate to the network if a measurement gap is required for the UE to perform SSB-based measurements, based on the UE's own capability. Some UEs may not need a measurement gap due to the higher complexity of the UE. For intra-frequency measurement, the UE may indicate that a measurement gap is needed if any of the UE configured bandwidth parts (BWPs) do not contain the frequency domain resources of the SSB associated with the initial downlink (DL) BWP; or the UE may indicate a measurement gap is not needed to measure the SSB associated with the initial downlink BWP for all configured BWPs, regardless of whether the SSB is within the configured BWP. For inter-frequency measurement, the UE may indicate whether a measurement gap is required for the UE to perform SSB-based measurements on the concerned new radio (NR) target band. Based on the UE's indication, the network can determine and configure a measurement gap to the UE. Accordingly, the UE performs a neighbor cell measurement. The UE is not specified to perform data communication with the network within the configured measurement gap.

In an NTN, if the UE 115 is configured to measure a neighbor cell 620 from its current serving satellite, for example, the satellite 140 shown in FIG. 6, the SSB from the neighbor cell 620 may experience the same delay and Doppler effect as the SSB from the serving cell 610 due to the same serving satellite 140. In this case, if the SSB is within the UE's configured/activated BWP, the UE 115 can leverage the serving cell downlink time and/or the serving cell frequency information to measure the neighbor cell 620, and a measurement gap may not be needed, which is the same as with terrestrial networks. In this case, the UE 115 may use the same receive chain for the measurements and for communicating with the serving cell 610.

However, if the UE 115 is configured to measure a neighbor cell 620 served by another satellite, for example, the next upcoming satellite 140-*a*, as shown in FIG. 7, the SSB from the neighbor cell 620 arriving at the UE may experience a very different delay and Doppler effect, compared to the SSB from the serving cell 610. In this case, the UE 115 may need more complexity to receive/measure the SSB from the neighbor cell 620. Thus, the UE 115 may need to request a measurement gap to measure the neighbor cell 620. It is noted that if the UE 115 uses the neighbor cell's ephemeris data to adapt its radio frequency (RF) chain to measure the neighbor cell 620, this approach could still introduce additional UE complexity if a measurement gap is not used while the receive chain tunes away for the measurement. The additional complexity may not be desirable for low cost UEs, for example, Internet-of-Things (IoT) or reduced capacity (RedCap) devices.

Thus, whether the UE needs a measurement gap for neighbor cell measurements depends on the time and/or frequency difference between the serving cell's SSB and the neighbor cell's SSB seen at the UE, as well as the UE's complexity/capability. If the network does not have a proper measurement gap configuration for the UE, the UE may need to either skip a measurement (if a needed measurement gap is not configured) or the UE may interrupt the communication (if the network configures an unnecessary measurement gap). Improved measurement gap configuration may help account for these different parameters when operating in NTNs.

According to aspects of the present disclosure, a UE sends, to the network, a message indicating whether a measurement gap is needed for measuring a cell in an NTN. In some aspects, the indication may be different from the UE's indication for measurement in a terrestrial network. Based on the UE's indication, the network determines or updates if a measurement gap is to be configured for the UE to measure a neighbor cell in an NTN. The UE may then receive, from the network, a measurement gap configuration for the cell measurement (for example, neighbor cell measurement), when the message indicates a measurement gap is needed.

Figure 8:
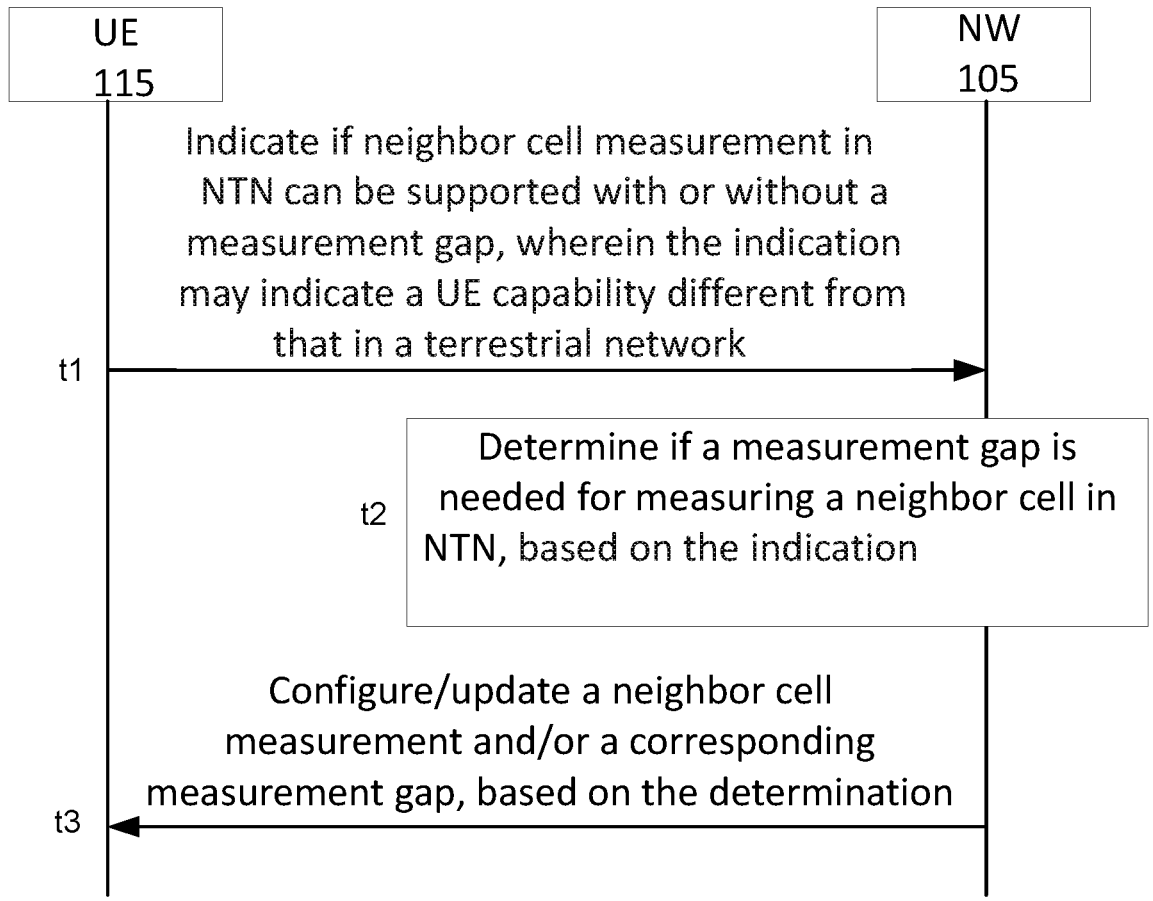
FIG. 8 is a timing diagram illustrating measurement gap configuration for non-terrestrial networks (NTNs), in accordance with one or more aspects of the present disclosure.

FIG. 8 is a timing diagram illustrating a measurement gap configuration for non-terrestrial networks (NTNs), in accordance with one or more aspects of the present disclosure. A UE 115 and network device 105 may be examples of the devices described with respect to FIG. 3. At time t1, the UE 115 indicates if a neighbor cell measurement in the NTN can be supported with, or without, a measurement gap. In some aspects, the indication may be different from the UE's indication for measurement in a terrestrial network. At time t2, the network device 105 determines if a measurement gap is needed for measuring the neighbor cell in the NTN, based on the indication received from the UE 115 at time t1. The indication may be different than an indication for a terrestrial network. At time t3, the network device 105 configures the UE 115 with a neighbor cell measurement and/or a corresponding measurement gap based on the determination at time t2.

In one example, the UE 115 may indicate to the network device 105 (or the UE is assumed/mandated to provide) support for intra-frequency neighbor cell measurement without a measurement gap in the terrestrial network, for example, via a legacy indication. According to aspects of the present disclosure, the UE 115 may indicate a need for a measurement gap for intra-frequency neighbor cell measurement in the NTN, which is different from the corresponding terrestrial network indication, due to the more severe delay and Doppler effect to be experienced by the UE 115 in the NTN.

In another example, the UE 115 indicates to the network device 105 support for inter-frequency neighbor cell measurement without a measurement gap for a targeted frequency band in a terrestrial network, for example, via the legacy indication. According to aspects of the present disclosure, the UE 115 may indicate a need for a measurement gap for inter-frequency neighbor cell measurement for the targeted frequency band in the NTN, which is different from the corresponding terrestrial network indication due to the more severe delay and Doppler effect to be experienced by the UE 115 in the NTN.

In some aspects of the present disclosure, the UE may indicate that a measurement gap is not needed to measure an NTN cell served by the same satellite as its serving cell, because the UE may experience the same time and/or frequency effects for the SSBs from the two cells. Additionally, or alternatively, the UE may indicate that a measurement gap is needed to measure an NTN cell served by a different satellite than its serving cell, because the UE may experience different time and/or frequency effects between the SSBs from the two cells. In this case, the network determines if a measurement gap should be configured to the UE by determining if the neighbor cell is served by the same satellite. It is noted that the present description refers to SSBs. Other reference signals, such as a channel state information reference signal (CSI-RS), tracking reference signal (TRS), or positioning reference signal (PRS) are also contemplated.

In some aspects, the UE may determine a maximum time and/or frequency difference value or range that the UE supports without the need for a measurement gap, for example, based on the UE's own capability. In one option, the UE sends the determined value or range to the network as the indication or together with the indication. Accordingly, the network determines if a considered neighbor cell measurement specifies a measurement gap. For example, the network may estimate the time and/or frequency difference to be experienced by the UE. The time and/or frequency difference is between the UE's serving cell's SSB and the considered neighbor cell's SSB. The network's estimate may be based on UE coarse location information, the cell footprint or coverage area, and/or the cell ephemeris information. If the estimated difference is larger than the UE reported value, the network configures a measurement gap for the UE to measure the considered neighbor cell. In another option, the UE may first receive a list of neighbor cells and their ephemeris information from the network. Afterward, the UE may estimate the time and/or frequency difference between the UE serving cell SSB and a listed neighbor cell SSB, based on the UE's own location information and the two cells' ephemeris information. Based on the information, the UE compares the estimate with the maximum time and/or frequency difference value or range supported without the need for a measurement gap. Accordingly, the UE determines and sends the indication to the network of whether a measurement gap is needed for measuring a listed neighbor cell.

In some aspects of the present disclosure, the UE may transmit a single indication for the intra-frequency neighbor cell measurement and the inter-frequency neighbor cell measurement in the NTN. The indication describes the same UE capability for the intra-frequency neighbor cell measurement in the NTN and the inter-frequency neighbor cell measurement in the NTN. In some aspects, the indication may be transmitted in a radio resource control (RRC) message, a media access control (MAC) control element (CE), and/or a physical layer message from the UE to the network.

In other aspects, the UE may transmit separate indications for the intra-frequency neighbor cell measurement and the inter-frequency neighbor cell measurement in the NTN. In these aspects, the UE may indicate different UE capabilities for the intra-frequency neighbor cell measurement and the inter-frequency neighbor cell measurement in the NTN. For example, the UE may indicate support for intra-frequency neighbor cell measurement without a measurement gap, in case the neighbor cell is served by the same satellite as the serving cell. However, the UE may indicate that it cannot support inter-frequency neighbor cell measurement without a measurement gap, regardless of whether the neighbor cell is served by the same satellite as the serving cell. In some aspects, the indication may be transmitted in a radio resource control (RRC) message, a media access control (MAC) control element (CE), and/or a physical layer message from the UE to the network.

In some aspects, the UE transmitting the indication may be triggered by receiving a request or message from the network. In one option, the network may send the request or message with a one bit indication. For example, the bit may be within a system information block (SIB), and/or a dedicated RRC message, to the UE. Additionally, or alternatively, the network may transmit a list of neighbor cell information to the UE for the UE to determine if and/or which neighbor cell's measurement specifies a measurement gap. In this case, the list of neighbor cell information may be considered as the request/message from the network, in other words, an implicit trigger for the UE to send the NTN measurement gap information.

According to aspects of the present disclosure, upon receiving the UE indication, the network may determine a preference for the UE cell measurement and/or handover activity, such as conditional handover activity. For example, if multiple satellites serve multiple neighbor cells for the UE, the network may configure the UE with a cell measurement on the subset of neighbor cell(s), whose measurement do not specify a measurement gap at the UE, in order to avoid communication and/or service interruption.

The described aspects of the present disclosure improve accuracy of a network in determining if a measurement gap should be configured for the UE to measure a neighbor cell in NTNs. Allocating a necessary measurement gap helps the UE execute its measurement task properly and, thus, the described aspects provide better support for mobility and service continuity. Moreover, the described aspects avoid unnecessary measurement gaps, helping the system avoid unnecessary communication interruption. As a result, better mobility and reliability are achieved. In addition, a higher data rate occurs due to the avoidance of unnecessary measurement gap/communication interruptions.

Figure 9:
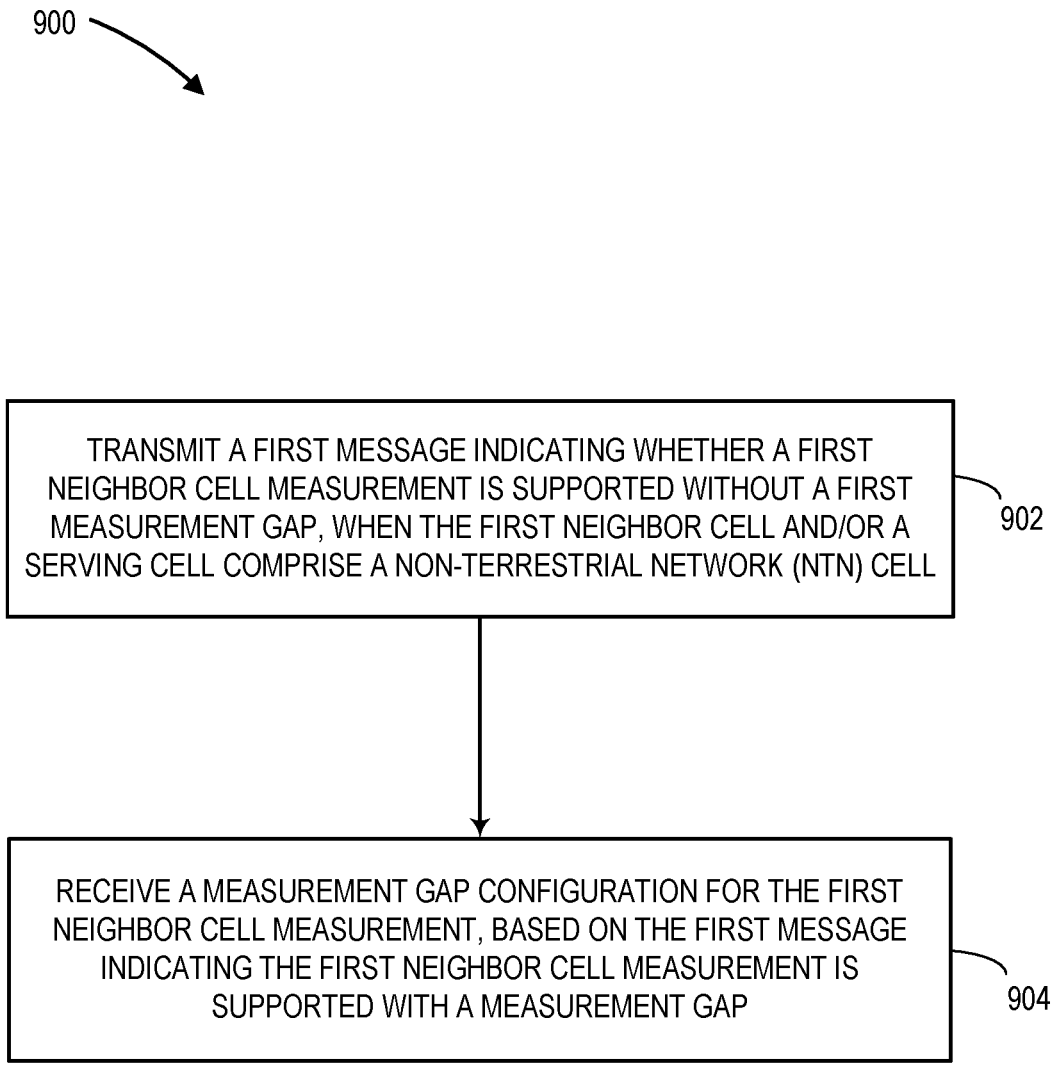
FIG. 9 is a flow diagram illustrating an example process performed, for example, by a user equipment (UE), in accordance with various aspects of the present disclosure.

FIG. 9 is a flow diagram illustrating an example process 900 performed, for example, by a user equipment (UE), in accordance with various aspects of the present disclosure. The example process 900 is an example of improving measurement configurations in non-terrestrial networks. The operations of the process 900 may be implemented by a UE 115.

At block 902, the user equipment (UE) transmits a first message indicating whether a first neighbor cell measurement is supported without a first measurement gap, when the first neighbor cell and/or a serving cell comprise a non-terrestrial network (NTN) cell. For example, the UE (e.g., using antenna 252, DEMOD/MOD 254, TX MIMO processor 266, transmit processor 264, controller/processor 280, memory 282, and/or the like) may transmit the first message. In some aspects, the first neighbor cell is served by a same satellite as the serving cell, and the first message indicates the first measurement gap is not needed. In other aspects, the first neighbor cell is served by a different satellite than the serving cell, and the first message indicates the first measurement gap is needed. The first message may be transmitted in response to a trigger received from a network.

At block 904, the user equipment (UE) receives a measurement gap configuration for the first neighbor cell measurement, based on the first message indicating the first neighbor cell measurement is supported with a measurement gap. For example, the UE (e.g., using antenna 252, DEMOD/MOD 254, MIMO detector 256, receive processor 258, controller/processor 280, memory 282, and/or the like) may receive the measurement gap configuration. In some aspects, the first message indicates a maximum time and/or frequency difference of a communication via the serving cell compared to a communication via the first neighbor cell, whose measurement can be supported without the first measurement gap. The first message may associated with intra-frequency neighbor cell measurement and/or inter-frequency neighbor cell measurement.

Figure 10:
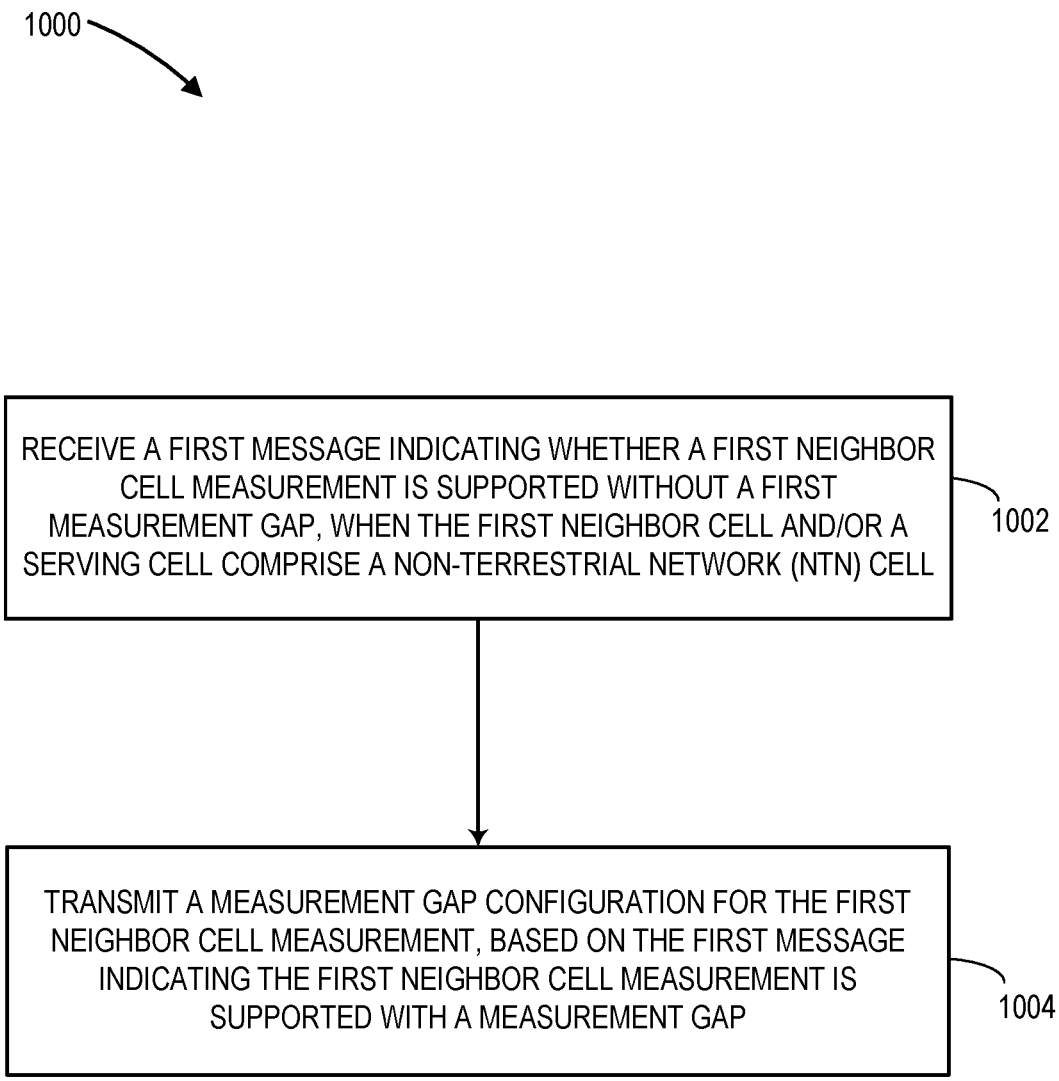
FIG. 10 is a flow diagram illustrating an example process performed, for example, by a network device, in accordance with various aspects of the present disclosure.

FIG. 10 is a flow diagram illustrating an example process 1000 performed, for example, by a network device, in accordance with various aspects of the present disclosure. The example process 1000 is an example of improving measurement configurations in non-terrestrial networks. The operations of the process 1000 may be implemented by a base station 105.

At block 1002, the base station receives a first message indicating whether a first neighbor cell measurement is supported without a first measurement gap, when the first neighbor cell and/or a serving cell comprise a non-terrestrial network (NTN) cell. For example, the base station (e.g., using antenna 230, MOD/DEMOD 232, MIMO detector 236, receive processor 238, controller/processor 240, memory 242, and/or the like) may receive the first message. In some aspects, the first neighbor cell is served by a same satellite as the serving cell, and the first message indicates the first measurement gap is not needed. In other aspects, the first neighbor cell is served by a different satellite than the serving cell, and the first message indicates the first measurement gap is needed. The first message may be received in response to a trigger transmitted by the base station.

At block 1004, the base station transmits a measurement gap configuration for the first neighbor cell measurement, based on the first message indicating the first neighbor cell measurement is supported with a measurement gap. For example, the base station (e.g., using antenna 234, MOD/DEMOD 232, TX MIMO processor 230, transmit processor 220, controller/processor 240, memory 242, and/or the like) may transmit the measurement gap configuration. In some aspects, the first message indicates a maximum time and/or frequency difference of a communication via the serving cell compared to a communication via the first neighbor cell, whose measurement can be supported without the first measurement gap. The first message may associated with intra-frequency neighbor cell measurement and/or inter-frequency neighbor cell measurement.

EXAMPLE ASPECTS

Aspect 1: A method of wireless communication by a user equipment (UE), comprising: transmitting a first message indicating whether a first neighbor cell measurement is supported without a first measurement gap, when the first neighbor cell and/or a serving cell comprise a non-terrestrial network (NTN) cell; and receiving a measurement gap configuration for the first neighbor cell measurement, based on the first message indicating the first neighbor cell measurement is supported with a measurement gap.

Aspect 2: The method of Aspect 1, in which: the first neighbor cell is served by a same satellite as the serving cell; and the first message indicates the first measurement gap is not needed.

Aspect 3: The method of Aspect 1, in which: the first neighbor cell is served by a different satellite than the serving cell; and the first message indicates the first measurement gap is needed.

Aspect 4: The method of any of the preceding Aspects, in which the first message indicates a maximum time and/or frequency difference of a communication via the serving cell compared to a communication via the first neighbor cell, whose measurement can be supported without the first measurement gap.

Aspect 5: The method of any of the preceding Aspects, further comprising determining a maximum time and/or frequency difference of a communication via the serving cell compared to a communication via the first neighbor cell, whose measurement can be supported without the first measurement gap.

Aspect 6: The method of any of the preceding Aspects, further comprising: estimating a frequency and/or time difference between a UE serving cell reference signal and a neighbor cell reference signal; receiving information related to the neighbor cell; and determining whether the first neighbor cell measurement is supported without the measurement gap based on the estimating and based on the received information.

Aspect 7: The method of any of the preceding Aspects, in which the first message is associated with intra-frequency neighbor cell measurement and/or inter-frequency neighbor cell measurement.

Aspect 8: The method of any of the preceding Aspects, further comprising receiving, from a network, a trigger for sending the first message, in which the first message is transmitted based on receiving the trigger.

Aspect 9: The method of any of the preceding Aspects, further comprising transmitting a second message indicating whether a second neighbor cell measurement is supported without a second measurement gap, when the second neighbor cell and the serving cell both comprise terrestrial network cells.

Aspect 10: A method of wireless communication by a network device, comprising: receiving a first message indicating whether a first neighbor cell measurement is supported without a first measurement gap, when the first neighbor cell and/or a serving cell comprise a non-terrestrial network (NTN) cell; and transmitting a measurement gap configuration for the first neighbor cell measurement, based on the first message indicating the first neighbor cell measurement is supported with a measurement gap.

Aspect 11: The method of Aspect 10, in which: the first neighbor cell is served by a same satellite as the serving cell; and the first message indicates the first measurement gap is not needed.

Aspect 12: The method of Aspect 10, in which: the first neighbor cell is served by a different satellite than the serving cell; and the first message indicates the first measurement gap is needed.

Aspect 13: The method of any of the Aspects 10-12, in which the first message indicates a maximum time and/or frequency difference of a communication via the serving cell compared to a communication via the first neighbor cell, whose measurement can be supported without the first measurement gap.

Aspect 14: The method of any of the Aspects 10-13, further comprising: estimating a frequency and/or time difference between a user equipment (UE) serving cell reference signal and a neighbor cell reference signal; and determining whether the first neighbor cell measurement is supported without the measurement gap based on the estimating and based on information related to the neighbor cell.

Aspect 15: The method of any of the Aspects 10-14, in which the first message is associated with intra-frequency neighbor cell measurement and/or inter-frequency neighbor cell measurement.

Aspect 16: The method of any of the Aspects 10-15, further comprising transmitting a trigger for sending the first message, in which the first message is received based on transmitting the trigger.

Aspect 17: The method of any of the Aspects 10-16, further comprising receiving a second message indicating whether a second neighbor cell measurement is supported without a second measurement gap, when the second neighbor cell and the serving cell both comprise terrestrial network cells.

Aspect 18: An apparatus for wireless communication by a user equipment (UE), comprising: a memory; and at least one processor coupled to the memory, the at least one processor configured: to transmit a first message indicating whether a first neighbor cell measurement is supported without a first measurement gap, when the first neighbor cell and/or a serving cell comprise a non-terrestrial network (NTN) cell; and to receive a measurement gap configuration for the first neighbor cell measurement, based on the first message indicating the first neighbor cell measurement is supported with a measurement gap.

Aspect 19: The apparatus of Aspect 18, in which: the first neighbor cell is served by a same satellite as the serving cell; and the first message indicates the first measurement gap is not needed.

Aspect 20: The apparatus of Aspect 18, in which: the first neighbor cell is served by a different satellite than the serving cell; and the first message indicates the first measurement gap is needed.

Aspect 21: The apparatus of any of the Aspects 18-20, in which the first message indicates a maximum time and/or frequency difference of a communication via the serving cell compared to a communication via the first neighbor cell, whose measurement can be supported without the first measurement gap.

Aspect 22: The apparatus of any of the Aspects 18-21, in which the at least one processor is further configured to determine a maximum time and/or frequency difference of a communication via the serving cell compared to a communication via the first neighbor cell, whose measurement can be supported without the first measurement gap.

Aspect 23: The apparatus of any of the Aspects 18-22, in which the at least one processor is further configured: to estimate a frequency and/or time difference between a UE serving cell reference signal and a neighbor cell reference signal; to receive information related to the neighbor cell; and to determine whether the first neighbor cell measurement is supported without the measurement gap based on the estimating and based on the received information.

Aspect 24: The apparatus of any of the Aspects 18-23, in which the first message is associated with intra-frequency neighbor cell measurement and/or inter-frequency neighbor cell measurement.

Aspect 25: The apparatus of any of the Aspects 18-24, in which the at least one processor is further configured to receive, from a network, a trigger for sending the first message, in which the first message is transmitted based on receiving the trigger.

Aspect 26: The apparatus of any of the Aspects 18-25, in which the at least one processor is further configured to transmit a second message indicating whether a second neighbor cell measurement is supported without a second measurement gap, when the second neighbor cell and the serving cell both comprise terrestrial network cells.

Aspect 27: An apparatus for wireless communication by a network device, comprising: a memory; and at least one processor coupled to the memory, the at least one processor configured: to receive a first message indicating whether a first neighbor cell measurement is supported without a first measurement gap, when the first neighbor cell and/or a serving cell comprise a non-terrestrial network (NTN) cell; and to transmit a measurement gap configuration for the first neighbor cell measurement, based on the first message indicating the first neighbor cell measurement is supported with a measurement gap.

Aspect 28: The apparatus of Aspect 27, in which: the first neighbor cell is served by a same satellite as the serving cell; and the first message indicates the first measurement gap is not needed.

Aspect 29: The apparatus of Aspect 27, in which: the first neighbor cell is served by a different satellite than the serving cell; and the first message indicates the first measurement gap is needed.

Aspect 30: The apparatus of any of the Aspects 27-29, in which the first message indicates a maximum time and/or frequency difference of a communication via the serving cell compared to a communication via the first neighbor cell, whose measurement can be supported without the first measurement gap.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM. ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed.

What is claimed is:

1. A method of wireless communication by a user equipment (UE), comprising:
    transmitting a first message indicating whether a first neighbor cell measurement is supported without a first measurement gap, when a first neighbor cell and/or a serving cell comprise a non-terrestrial network (NTN) cell;
    transmitting a second message indicating whether a second neighbor cell measurement is supported without a second measurement gap, when a second neighbor cell and the serving cell both comprise terrestrial network cells; and
    receiving a measurement gap configuration for the first neighbor cell measurement, based on the first message indicating the first neighbor cell measurement is supported with a measurement gap.

2. The method of claim 1, in which:
    the first neighbor cell is served by a same satellite as the serving cell; and
    the first message indicates the first measurement gap is not needed.

3. The method of claim 1, in which:
    the first neighbor cell is served by a different satellite than the serving cell; and
    the first message indicates the first measurement gap is needed.

4. The method of claim 1, in which the first message indicates a maximum time and/or frequency difference of a communication via the serving cell compared to a communication via the first neighbor cell, whose measurement can be supported without the first measurement gap.

5. The method of claim 1, further comprising determining a maximum time and/or frequency difference of a communication via the serving cell compared to a communication via the first neighbor cell, whose measurement can be supported without the first measurement gap.

6. The method of claim 1, further comprising:
estimating a frequency and/or time difference between a UE serving cell reference signal and a neighbor cell reference signal;
receiving information related to the first neighbor cell; and
determining whether the first neighbor cell measurement is supported without the measurement gap based on the estimating and based on the received information.

7. The method of claim 1, in which the first message is associated with intra-frequency neighbor cell measurement and/or inter-frequency neighbor cell measurement.

8. The method of claim 1, further comprising receiving, from a network, a trigger for sending the first message, in which the first message is transmitted based on receiving the trigger.

9. A method of wireless communication by a network device, comprising:
receiving a first message indicating whether a first neighbor cell measurement is supported without a first measurement gap, when a first neighbor cell and/or a serving cell comprise a non-terrestrial network (NTN) cell;
receiving a second message indicating whether a second neighbor cell measurement is supported without a second measurement gap, when a second neighbor cell and the serving cell both comprise terrestrial network cells; and
transmitting a measurement gap configuration for the first neighbor cell measurement, based on the first message indicating the first neighbor cell measurement is supported with a measurement gap.

10. The method of claim 9, in which:
the first neighbor cell is served by a same satellite as the serving cell; and
the first message indicates the first measurement gap is not needed.

11. The method of claim 9, in which:
the first neighbor cell is served by a different satellite than the serving cell; and
the first message indicates the first measurement gap is needed.

12. The method of claim 9, in which the first message indicates a maximum time and/or frequency difference of a communication via the serving cell compared to a communication via the first neighbor cell, whose measurement can be supported without the first measurement gap.

13. The method of claim 9, further comprising:
estimating a frequency and/or time difference between a user equipment (UE) serving cell reference signal and a neighbor cell reference signal; and
determining whether the first neighbor cell measurement is supported without the measurement gap based on the estimating and based on information related to the first neighbor cell.

14. The method of claim 9, in which the first message is associated with intra-frequency neighbor cell measurement and/or inter-frequency neighbor cell measurement.

15. The method of claim 9, further comprising transmitting a trigger for sending the first message, in which the first message is received based on transmitting the trigger.

16. An apparatus for wireless communication by a user equipment (UE), comprising:
a memory; and
at least one processor coupled to the memory, the at least one processor configured:
to transmit a first message indicating whether a first neighbor cell measurement is supported without a first measurement gap, when a first neighbor cell and/or a serving cell comprise a non-terrestrial network (NTN) cell;
to transmit a second message indicating whether a second neighbor cell measurement is supported without a second measurement gap, when a second neighbor cell and the serving cell both comprise terrestrial network cells; and
to receive a measurement gap configuration for the first neighbor cell measurement, based on the first message indicating the first neighbor cell measurement is supported with a measurement gap.

17. The apparatus of claim 16, in which:
the first neighbor cell is served by a same satellite as the serving cell; and
the first message indicates the first measurement gap is not needed.

18. The apparatus of claim 16, in which:
the first neighbor cell is served by a different satellite than the serving cell; and
the first message indicates the first measurement gap is needed.

19. The apparatus of claim 16, in which the first message indicates a maximum time and/or frequency difference of a communication via the serving cell compared to a communication via the first neighbor cell, whose measurement can be supported without the first measurement gap.

20. The apparatus of claim 16, in which the at least one processor is further configured to determine a maximum time and/or frequency difference of a communication via the serving cell compared to a communication via the first neighbor cell, whose measurement can be supported without the first measurement gap.

21. The apparatus of claim 16, in which the at least one processor is further configured:
to estimate a frequency and/or time difference between a UE serving cell reference signal and a neighbor cell reference signal;
to receive information related to the first neighbor cell; and
to determine whether the first neighbor cell measurement is supported without the measurement gap based on the estimating and based on the received information.

22. The apparatus of claim 16, in which the first message is associated with intra-frequency neighbor cell measurement and/or inter-frequency neighbor cell measurement.

23. The apparatus of claim 16, in which the at least one processor is further configured to receive, from a network, a trigger for sending the first message, in which the first message is transmitted based on receiving the trigger.

24. An apparatus for wireless communication by a network device, comprising:
a memory; and
at least one processor coupled to the memory, the at least one processor configured:
to receive a first message indicating whether a first neighbor cell measurement is supported without a first measurement gap, when a first neighbor cell and/or a serving cell comprise a non-terrestrial network (NTN) cell;
to receive a second message indicating whether a second neighbor cell measurement is supported without a second measurement gap, when a second neighbor cell and the serving cell both comprise terrestrial network cells; and to transmit a measurement gap configuration for the first neighbor cell measurement, based on the first message indicating the first neighbor cell measurement is supported with a measurement gap.

25. The apparatus of claim 24, in which:

the first neighbor cell is served by a same satellite as the serving cell; and the first message indicates the first measurement gap is not needed.

26. The apparatus of claim 24, in which:

the first neighbor cell is served by a different satellite than the serving cell; and the first message indicates the first measurement gap is needed.

27. The apparatus of claim 24, in which the first message indicates a maximum time and/or frequency difference of a communication via the serving cell compared to a communication via the first neighbor cell, whose measurement can be supported without the first measurement gap.

* * * * *